United States Patent
Gartstein et al.

(10) Patent No.: US 7,923,106 B2
(45) Date of Patent: *Apr. 12, 2011

(54) RESPONSIVE COATED SUBSTRATES

(75) Inventors: Vladimir Gartstein, Mason, OH (US);
David S. Salloum, Hamilton, OH (US);
Faiz Feisal Sherman, Mason, OH (US);
Robert Mikhailovych Lupitskyy,
Potsdam, NY (US); Sergiy Minko,
Potsdam, NY (US); Mikhail Motornov,
Potsdam, NY (US); **Roman
Bogdanovych Sheparovych**, Potsdam,
NY (US)

(73) Assignee: The Procter & Gamble Company,
Cincinnati, OH (US)

( * ) Notice: Subject to any disclaimer, the term of this patent is extended or adjusted under 35 U.S.C. 154(b) by 963 days.

This patent is subject to a terminal disclaimer.

(21) Appl. No.: 11/705,837

(22) Filed: Feb. 14, 2007

(65) Prior Publication Data

US 2007/0190299 A1 Aug. 16, 2007

Related U.S. Application Data

(60) Provisional application No. 60/773,260, filed on Feb. 14, 2006.

(51) Int. Cl.
*B32B 5/16* (2006.01)
(52) U.S. Cl. .......................... 428/327; 428/407; 428/447
(58) Field of Classification Search .................. 428/327, 428/407, 447; 525/474, 478
See application file for complete search history.

(56) References Cited

U.S. PATENT DOCUMENTS

| | | | |
|---|---|---|---|
| 4,715,986 A * | 12/1987 | Gruning et al. ............... | 516/100 |
| 5,672,297 A | 9/1997 | Soane | |
| 5,939,485 A * | 8/1999 | Bromberg et al. ............ | 524/556 |
| 5,997,748 A | 12/1999 | Rosenberg et al. | |
| 6,254,634 B1 | 7/2001 | Anderson et al. | |
| 6,435,665 B2 | 8/2002 | Lerat et al. | |
| 6,451,895 B1 | 9/2002 | Topolkaraev et al. | |
| 6,855,773 B1 | 2/2005 | Jensen et al. | |
| 6,967,059 B2 * | 11/2005 | Sanada et al. ................. | 428/405 |
| 7,020,355 B2 | 3/2006 | Lahann et al. | |
| 7,572,844 B2 * | 8/2009 | Sato et al. ..................... | 523/160 |
| 2002/0106513 A1 | 8/2002 | Matyjaszewski et al. | |
| 2003/0194555 A1 | 10/2003 | Campbell et al. | |

FOREIGN PATENT DOCUMENTS

| | | |
|---|---|---|
| EP | 0 608 274 B1 | 12/1996 |
| EP | 0 748 342 B1 | 10/2001 |
| EP | 1 350 575 A2 | 10/2003 |
| WO | WO 2004/096422 A1 | 11/2004 |

OTHER PUBLICATIONS

U.S. Appl. No. 11/705,836, filed Feb. 14, 2007, Gartstein et al.

Draper, J., et al., "Mixed Polymer Brushes by Sequential Polymer Addition: Anchoring Layer Effect," *Langmuir*, 2004, vol. 20, pp. 4064-4075.
Minko, S., et al., "Environment-Adopting Surfaces with Reversibly Switchable Morphology," *Macromol. Rapid Commun.*, 2001, vol. 22, pp. 206-211.
Ionov, L., et al., "Gradient Mixed Brushes: 'Grafting To' Approach," *Macromolecules*, 2004, vol. 37, pp. 7421-7423.
Sidorenko, AL., et al., "Switching of Polymer Brushes," *Langmuir*, 1999, vol. 15, pp. 8349-8355.
Uhlmann, P., et al., "Surface functionalization by smart coatings: Stimuli-responsive binary polymer brushes," *Progress in Organic Coatings*, 2006, vol. 55, pp. 168-174.
Zhao, B., et al., "Polymer brushes: surface-immobilized macromolecules," *Prog. Polym. Sci.*, vol. 25, 2000, pp. 677-710.
Ionov, L., et al., "Reversible Chemical Patterning on Stimuli-Responsive Polymer Film: Environment-Responsive Lithography," *J. Am. Chem. Soc.*, 2003, vol. 125, pp. 8302-8306.
Uhlmann, P., et al., "Surface functionalization by smart binary polymer brushes to tune physico-chemical characteristics at biointerfaces," *e-Polymers*, 2005, Vo. 75, pp. 1-10.
Lupitskyy, R., et al., "From Smart Polymer Molecules to Responsive Nanostructured Surfaces," *Langmuir*, 2005, vol. 21, pp. 8591-8593.
Riskin, M., et al., "Switchable Surface Properties through the Electrochemical or Biocatalytic Generation of $Ag^0$ Nanoclusters on Monolayer-Functionalized Electrodes," *J. Am. Chem. Soc.*, 2006, vol. 128, pp. 1253-1260.
Kohut, A., et al., "Design of a New Invertible Polymer Coating on a Solid Surface and Its Effect on Dispersion Colloidal Stability," *Langmuir*, 2006, vol. 22, pp. 6498-6506.
Ketelson, H. A., et al., "Sterically Stabilized Silica Colloids: Radical Grafting of Poly(methyl methacrylate) and Hydrosilylative Grafting of Silicones to Functionalized Silica," Polymers for Advanced Technologies, vol. 6, 1995, pp. 335-344.
Zhang, M. et al., "Double-responsive polymer brushes on the surface of colloid particles," *Journal of Colloid and Interface Science*, vol. 301, 2006, pp. 85-91.
Yang, J. et al., "The Preparation and Surface Properties of Silicone-grafted Acrylic Copolymer Coatings," *High Performance Polymers*, 2005, vol. 17, pp. 85-102.
Yoshihara, T., "Dispersion of surface-modified ultrafine particles by use of hydrophobic monomers," *International Journal of Adhesion & Adhesives*, vol. 19, 1999, pp. 353-357.
Jiang, B., et al., "Surface Modification on Nanoscale Titanium Dioxide by Radiation: Preparation and Characterization," Journal of Applied Polymer Science, vol. 100, 2006, pp. 3510-3518.
Akiva, U., et al., "New micrometer-sized monodispersed self-assembled amphiphilic polystyrene/poly(*n*-butyl methacrylate) composite particles of hemispherical morphology: synthesis and characterization," *Colloids and Surfaces A: Physicochem. Eng. Aspects*, vol. 253, 2005, pp. 9-13.
PCT International Search Report, Jul. 25, 2007, 5 pages.

* cited by examiner

*Primary Examiner* — H. (Holly) T Le
(74) *Attorney, Agent, or Firm* — John M Howell

(57) ABSTRACT

A responsive coated substrate, said substrate comprising an interfacial surface to which a responsive coating attaches, said responsive coating comprising (a) at least one silicone-based, substantially hydrophobic polymer and (b) at least one substantially hydrophilic polymer wherein said responsive coating substrate is in a first state; and methods of coating the same.

13 Claims, No Drawings

RESPONSIVE COATED SUBSTRATES

CROSS REFERENCE TO RELATED APPLICATION

This application claims the benefit of U.S. Provisional Application No. 60/773,260, filed Feb. 14, 2006.

FIELD OF THE INVENTION

The present invention relates to a responsive coating provided over the interfacial surface of a particle. Particularly, the invention relates to a responsive coating comprising at least one substantially hydrophobic and at least one substantially hydrophilic polymer formed on a particle's interfacial surface. More particularly, the invention relates to a responsive coating that can switch from a first state to at least a second state, e.g., from a substantially hydrophilic state to a substantially hydrophobic state, upon exposure to an external stimulus, a change in an environmental condition, or time.

BACKGROUND OF THE INVENTION

Interactions at the solid/liquid interface, such as protein adsorption, cell adhesion, and bio-fouling, may be determined by the outermost surface of a substrate. In order to improve a product's interfacial properties, it is desirable to enhance or prevent wetness attributes associated with a particular substrate. For example, it has been desirable to advance technologies concerning wettability properties of particular products such as feminine care and incontinence articles, baby care products, fabric care products and generally, disposable articles in order to improve comfort. Many techniques have been employed to address these concerns but have failed to provide a commercially viable substrate that provides a diverse use within consumer care products.

For example, the Nanopin film was developed around 2005 possessing highly unusual hydrophobic properties. Such technology is characterized as having a "Lotus-Effect" whereby the surface exhibits a hydrophobic characteristic, i.e., extremely poor wettability characteristics and high liquid contact angles. A droplet of water that contacts the surface of the Nanopin film forms an almost perfect sphere with a wet contact angle of approximately 178°.

While hydrophobic surfaces such as Nanopin film may offer a number of commercial advantages, coating a surface of a substrate to provide such hydrophobic conditions fails to address the commercially viable concerns of being useful for a diverse array of uses. For example, it may be desirable to form or coat a surface to exhibit hydrophilic properties in a first instance but, upon application of an external stimulus, can switch to exhibit hydrophobic properties in a second instance. Another example may include the desire to form or coat a surface to exhibit hydrophobic properties in a final instance but requires the coating to be in an initial hydrophilic state in order to allow for a substance to disperse in an aqueous medium. Without being bound by theory, a consumer may desire a liquid solution, comprising hydrophilic particles, to be applied over a household surface for the purposes of cleaning. Upon deposition and drying, the hydrophilic particles may switch from the first hydrophilic state to a second hydrophobic state in order to prevent bio-foul matter such as biological fluid from adhering to the surface.

In order to enhance the wetness properties of a substrate for commercial use as shown above, there must be a teaching that allows for such occurrence of switching between hydrophilic and hydrophobic states, particularly upon application of an external stimulus and/or change in an environmental condition. Since the prior art fails to disclose such structures, much less methods of forming them, the present invention overcomes such deficiencies and shortcomings by the particles disclosed herein.

SUMMARY OF THE INVENTION

The present invention relates to a responsive coated substrate, said substrate comprising an interfacial surface to which a responsive coating attaches, said responsive coating comprising (a) at least one silicone-based, substantially hydrophobic polymer and (b) at least one substantially hydrophilic polymer wherein said responsive coating substrate is in a first state.

The present invention also relates to a method of coating a substrate with a responsive coating, said method comprising the steps of (a) providing at least one responsive coated particle comprising an interfacial surface to which a responsive coating attaches, said responsive coating comprising at least one silicone-based, substantially hydrophobic polymer and at least one substantially hydrophilic polymer; and (b) grafting said responsive coated particle to the interfacial surface of said substrate such that the substrate is said to be in a first state.

DETAILED DESCRIPTION OF THE INVENTION

While the specification concludes with the claims particularly pointing out and distinctly claiming the invention, it is believed that the present invention will be better understood from the following description.

All percentages, parts and ratios are based upon the total weight of the compositions of the present invention, unless otherwise specified. All such weights as they pertain to listed ingredients are based on the active level and, therefore; do not include solvents or by-products that may be included in commercially available materials, unless otherwise specified. The term "weight percent" may be denoted as "wt. %" herein. Except where specific examples of actual measured values are presented, numerical values referred to herein should be considered to be qualified by the word "about".

All molecular weights as used herein are weight average molecular weights expressed as grams/mole, unless otherwise specified.

As used herein, "comprising" means that other steps and other ingredients which do not affect the end result can be added. This term encompasses the terms "consisting of" and "consisting essentially of". The compositions and methods/processes of the present invention can comprise, consist of, and consist essentially of the essential elements and limitations of the invention described herein, as well as any of the additional or optional ingredients, components, steps, or limitations described herein.

The term "substrate" as used herein refers to any organic, inorganic, synthetic, or non-synthetic surface. Examples of a substrate include, but are not limited to, a semiconductor wafer, skin, tissue, hard and soft surfaces, cells, woven and non-woven materials, hair, clothing, textiles, and combinations thereof.

The term "particles" is understood as a single particle or an aggregate of particles.

The term "interfacial surface" as used herein refers to any region that separates a single or multi-phases. Such multi-phases include, but are not limited to, solid-liquid phase, liquid-gas phase, solid-gas phase, and solid-solid phase.

While the interfacial surface of the present invention is directed to a solid-gas phase, it is understood that other phases will suffice when present.

The present invention relates to a responsive coating on a part or the entire surface of a substrate. The responsive coating is comprised of two or more polymers attached to the interfacial surface of a substrate. Such substrate may be coated directly or by a responsive coated particle that attaches to the interfacial surface of the substrate to allow for a responsive coated substrate that possess enhanced wettability properties.

The responsive coated substrate of the present invention may be directly coated on a part or on its entire interfacial surface. Substrates of the present invention may also be coated by the attachment of a responsive coated particle wherein the particle may be soft, hard, organic, inorganic, or mixtures thereof and may be selected from the group consisting of oxides, metals, and metal alloys. For example, hard, inorganic particles of the present invention may include, but are not limited to, aluminum oxide, magnesium oxide, iron, iron oxide, titanium dioxide, silica, zinc, zinc iron oxide, zinc oxide. Soft, organic particles of the present invention may include, but are not limited to, dendrimers with surface groups such as poly(amidoamine) (PAMAM) phosphorous, and polypropylenimine; silsesquioxane polymers; polystyrene; polymethyl methacrylate; polyethylene; nylon; melamine(polymethylenemelamine); polyactide; dextran; and chitosan. Particles of the present invention may be selected according to their Young's Modulus value (GPa). Particles of the present invention may have a Young's Modulus value of from about 0.01 GPa to about 1000 GPa. Soft, organic particles of the present invention may have Young's Modulus value of from about 0.01 to about 10 GPa. Hard, inorganic particles of the present invention may have Young's Modulus value of from about 50 GPa to about 1000 GPa.

The responsive coated particles should be small enough so as to minimize interference with visual surface attributes of a substrate to which it may adhere. Therefore, the particles may have a size from about 1 nm, from about 10 nm, from about 20 nm, or from about 1 μm and no more than about 500 nm, no more than 250 nm, no more than about 150 nm or no more than about 100 nm. The particles may also be round, spherical, platelets, elliptical, spherical, tubular, or irregular in shape.

The polymers of the present invention may be substantially hydrophobic, substantially hydrophilic, substantially oleophobic, substantially oleophilic, or mixtures thereof. Substantially hydrophobic polymers of the present invention may be selected from silicone groups, flouro groups, or mixtures thereof. Particularly, the silicone-based substantially hydrophobic polymers of the present invention may comprise siloxane polymers, specifically polydimethylsiloxane (PDMS) or aminopropyl-terminated PDMS. Substantially hydrophilic polymers of the present invention may be a polyelectrolyte, specifically polyethylenimine (PEI). Particularly, substantially hydrophilic polymers may be selected from the group consisting of polyethylene oxide and its derivatives, polyacrylamide and its derivatives, poly alkyl (acrylic) acid and its salts, polystyrene sulfonic acid and its salts, and mixtures thereof. The polymers may be attached directly to the substrate or to the substrate via a responsive coated particle in varying amounts to form a responsive coated substrate. For example, 70% of the substantially hydrophobic polymers may comprise PDMS while the remaining 30% of the substantially hydrophilic polymers may comprise PEI.

Without being bound by theory, the responsive coating of the present invention may comprise Polydimethylsiloxane (PDMS) as the substantially hydrophobic polymer. PDMS has a glass transition temperature (Tg) of approximately negative 125° C. (−125° C.), and a melting point (Tm) of approximately negative 40° C. (−40° C.). PDMS has very flexible siloxane bonds and the Tg of PDMS allows additional flexibility in the design and modification of the PDMS backbone. For instance, functional polymers may be added to the PDMS backbone changing the Tg of PDMS. PDMS also has higher permeability to gases than most other elastomeric materials. One important feature that PDMS provides is very low surface energies that are produced from the silicone polymeric surface. PDMS has a surface energy of approximately 20 dyne/cm. Polyethylenimine (PEI) may be selected as the substantially hydrophilic polymer due to its availability and good solubility at the desired pH. It provides the reactive groups (amine groups) for grafting to a particle surface.

The mass ratio of substantially hydrophobic polymers to substantially hydrophilic polymers may be greater than about 0.01, greater than about 0.05, greater than about 1.0, greater than about 2.0 or less than about 100, less than about 50.0, less than about 10.0, less than about 8.0, or less than about 2.0. For example, the mass ratio of substantially hydrophobic polymers to substantially hydrophilic polymers may be from about 0.01 to about 100.

The polymers of the present invention attach to the interfacial surface of a substrate directly or via a particle to form a responsive coating by means of grafting. The combination of particular elements such as the selection of polymers, the functional groups that attach to the selected polymers, and the mass ratio of the polymers are amongst various factors for programming the responsive coating of the present invention. By "programming", it is meant that the responsive coating is set by the aforementioned factors to exist in a particular state such as substantially hydrophobic, substantially hydrophilic, substantially oleophobic, substantially oleophilic, or mixtures thereof. The "first state" is considered as the first state that the substrate exists. The states may succeed accordingly (second state, third state, etc. . . . ) thereafter. The term "responsive" is used to describe the behavior of the coated substrate when exposed to a external stimulus including, but not limited to, environment, pH, polarity, temperature, and substrate surface (texture, type (solid, liquid, gas), material, etc. . . . ) to provide advantageous wettability properties.

Without being bound by theory, the responsive coated substrate may comprise a coating comprising PDMS and PEI wherein due to the substantially hydrophilic polymers (PEI), the coating allows the substrate to be substantially in a hydrophilic first state. When such substrate is exposed to an external stimulus such as bio-foul, the substrate may "respond" by switching from the substantially hydrophilic first state to a substantially hydrophobic second state. The substrate may be further exposed to an acidic solution with a pH of about 5.5 wherein the substrate may again "respond" by switching from the substantially hydrophobic second state to a substantially hydrophilic third state. Such behavior is exemplary of the coating and thus, the responsive coated substrate of the present invention.

Substrates of the present invention may also be subject to reversion as part of the response or switch from one state to another. For example, a substrate comprising the substantially hydrophobic coating of the present invention may be exposed to an external stimulus such as UV, pH or temperature causing the substrate to switch from the first substantially hydrophobic state to a second substantially hydrophilic state. After a period of time, the substrate may revert back to a substantially hydrophobic state without additional exposure to an external stimulus.

Thus, a substrate of the present invention may remain in a particular state until exposure to an external stimulus. Time, however, may also act as an intentional or unintentional factor that acts as a trigger to cause the coating of the substrate to switch. The response of the substrate is, however, determinable by its programming. Such behavior is exemplary of the coating and thus, the responsive coated substrate of the present invention.

EXAMPLES

The following examples further describe and demonstrate embodiments within the scope of the present invention. The examples are given solely for the purpose of illustration and are not to be construed as limitations of the present invention, as many variations thereof are possible without departing from the spirit and scope of the invention.

Example 1

Highly polished silicon substrate was cleaned in an ultrasonic bath three times with ethanol. The silicon substrate was treated with a cleaning solution comprising a concentration of $NH_4OH$ and $H_2O_2$ for approximately 1 hour (the time can range from about 30 minutes to about 120 minutes) at approximately 60° C. (the temperature can range from about 40° C. to about 150° C.). The silicon substrate was rinsed with Millipore water comprising a resistance of approximately 18 $M\Omega$/cm. PGMA (polyglycidylmethacrylate) is synthesized by free radical polymerization of glycydylmethacrylate initiated by thermal decomposition of an azo-initiator. A thin film of PGMA was deposited onto the Si-substrate surface by spin-coating a few drops of 0.05% solution of PGMA in MEK (methyl ethyl ketone). Deposition of PGMA allows for the introduction of a significant number of the reactive epoxy groups on the silica surface. Substrate was exposed for 2-3 minutes to high temperature (100° C.) and was left under environmental conditions for 4-5 hours to allow the PGMA to cross-link. Substrate was then thoroughly washed in MEK. A few drops of APDMS (aminopropyl terminated polydimethylsiloxane, Mw 5000) were placed onto the surface of Si-wafer to cover the entire surface. The sample was then placed in the vacuum oven at 75° C. Time of the grafting can be varied (10 to 90 min) to achieve different grafting densities of APDMS. The substrate was then washed in toluene to remove unreacted APDMS. Similarly, PEI (polyethyleneimine, Mw 10000) drops were added to the substrate and placed overnight at 100° C. then washed with water to remove excess polymer.

Contact angle measurement experiments were performed to study the wetting surface characteristics of the synthesized mixed polymer brushes on silica wafers. The samples were exposed to acidic water (pH 5.5) for 2 min. The exposure results in wetting the samples with the ratio of grafted polymers in the range from 0.44 to 0.22. That was observed by spreading of water droplet on the surface of the sample which was extracted from the bath with the acidic water. Then upon drying at ambient conditions the surface spontaneously switched to the hydrophobic state. The contact angle of water is 92°. The samples with the grafted ratio (APDMS/PEI) of 1.72 and 1.62 did not show any switching after exposure to acidic water. They always retained in the hydrophobic state (contact angle was 92°) due to the very high density of grafted APDMS in the brushes. Thus, for further investigation we used the samples with the ratio of APDMS/PEI of 0.44. The surface morphology of the grafted polymer brushes was investigated with AFM technique.

The switching from hydrophilic to hydrophobic is spontaneous on air. Moderate heating (70° C.) accelerates process. Hydrophilic state could be approached with water (pH 5.5).

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the term in a document incorporated herein by reference, the meaning or definition assigned to the term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A substrate comprising coated particles grafted to the interfacial surface of the substrate, the particle coating comprising:
   a. at least one silicone-based, substantially hydrophobic polymer and
   b. at least one substantially hydrophilic polymer
   wherein upon depositing the particles on the substrate, the coating's polymers attach to the surface of the particle allowing said particle to be programmed to exist in a first state where upon exposure to an external stimulus, the particle responds and is transformed from its first state to a second and distinguishable state.

2. The substrate of claim 1 wherein the substantially hydrophobic silicone-based polymers comprise PDMS.

3. The substrate of claim 2 wherein the particle's coating has a mass ratio of the silicone-based, substantially hydrophobic polymer to the substantially hydrophilic polymer greater than 0.05 and less than about 10.0.

4. The substrate of claim 1 wherein the substantially hydrophilic polymers comprise PEI.

5. The substrate of claim 4 wherein the particle's coating has a mass ratio of the silicone-based, substantially hydrophobic polymer to the substantially hydrophilic polymer greater than 0.05 and less than about 10.0.

6. The substrate of claim 5 wherein the particle's coating has a first state that's hydrophilic.

7. The substrate of claim 1 wherein the sizes of the coated particles range from about 1 nm to about 1 µm.

8. The substrate of claim 7 wherein coated particles have a Young's Modulus value from about 0.01 GPa to about 1000 GPa.

9. The substrate of claim 8 wherein the coated particles are soft, organic particles having a Young's Modulus value from about 0.01 GPa to about 10 GPa.

10. The substrate of claim 8 wherein coated particles are hard, inorganic particles having a Young's Modulus value from about 50 GPa to about 1000 GPa.

11. A method of switching the first state of coated particles grafted to the substrate of claim 1 to at least a second state comprising the step of exposing the coated particles to at least one external stimulus therein creating a transformation wherein the coated particles switch to a second state distinctive of the coated particle's first state.

12. The method of claim 11 wherein the coated particles revert from the distinctive second state to the first state when the initial external stimulus ceases.

13. The method of claim 11 wherein the coated particles are exposed to an additional external stimulus to create a transformation wherein the coated particles switch from the distinctive second state to a third distinctive state.

* * * * *